(12) United States Patent
Doumar et al.

(10) Patent No.: US 12,696,055 B2
(45) Date of Patent: *Jul. 28, 2026

(54) SYSTEM AND METHOD FOR LINK-INITIATED DYNAMIC-MODE COMMUNICATIONS

(71) Applicant: TapText llc, Coral Springs, FL (US)

(72) Inventors: Steve Doumar, Fort Lauderdale, FL (US); Paul Levasseur, Fort Lauderdale, FL (US)

(73) Assignee: TAPTEXT LLC, Coral Springs, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/407,340

(22) Filed: Jan. 8, 2024

(65) Prior Publication Data

US 2024/0224008 A1    Jul. 4, 2024

Related U.S. Application Data

(63) Continuation of application No. 17/360,731, filed on Jun. 28, 2021, now Pat. No. 11,871,308, which is a
(Continued)

(51) Int. Cl.
*H04W 4/23*          (2018.01)
*G06Q 30/0251*      (2023.01)
(Continued)

(52) U.S. Cl.
CPC .......... *H04W 4/23* (2018.02); *G06Q 30/0267* (2013.01); *H04N 21/462* (2013.01); *H04W 4/12* (2013.01); *H04W 4/80* (2018.02)

(58) Field of Classification Search
CPC ..... H04W 84/18; H04W 4/023; H04W 12/06; H04W 84/12; H04W 4/02; H04W 4/029; H04W 4/12; H04W 4/80; G06Q 30/0267
See application file for complete search history.

(56) References Cited

U.S. PATENT DOCUMENTS

| | | | |
|---|---|---|---|
| 6,741,974 B1 | 5/2004 | Harrison et al. | |
| 6,826,194 B1 | 11/2004 | Vered et al. | |

(Continued)

*Primary Examiner* — Ninos Donabed
(74) *Attorney, Agent, or Firm* — GALVIN PATENT LAW LLC; Brian R. Galvin

(57) ABSTRACT

A system and method for a dynamic-link communication process between an electronic device and a target product or service by serving content or facilitating communication between two electronic devices. The first step is engagement by an electronic device with an initiator that is linked with a specific product or service that triggers a text message to auto-populate on the electronic device. The message comprising metadata about the specific product or service. The second step is for the electronic device to send the auto-populated message to a message gateway thus initiating the communication between the electronic device and a product or service. The message gateway works with a management service and one or more databases to send content back to the electronic device or to facilitate and convert messages between the electronic device and a second electronic device, the second electronic device associated with a product or service.

10 Claims, 15 Drawing Sheets

Receive a message comprising at least a source address and an initiator ID
1101

Retreive the rules associated with the initiator ID
1102

Determine an available agent based on the rules
1103

Identify the available agent's mode of communication
1104

Mask personally identifiable information in the message
1105

Reformat the first message to match the agent's mode of communication
1106

Send the reformatted and masked message to the agent
1107

Repeat the reformatting and masking of all messages until the communication is terminated
1108

Related U.S. Application Data continuation-in-part of application No. 17/229,251, filed on Apr. 13, 2021, now abandoned, which is a continuation-in-part of application No. 17/209,474, filed on Mar. 23, 2021, now Pat. No. 11,599,916, which is a continuation-in-part of application No. 17/208,059, filed on Mar. 22, 2021, now Pat. No. 11,562,407, which is a continuation-in-part of application No. 17/191,977, filed on Mar. 4, 2021, now abandoned, which is a continuation-in-part of application No. 17/190,260, filed on Mar. 2, 2021, now Pat. No. 11,532,020, which is a continuation-in-part of application No. 17/153,426, filed on Jan. 20, 2021, now abandoned, said application No. 17/360,731 is a continuation-in-part of application No. 17/085,931, filed on Oct. 30, 2020, now Pat. No. 11,055,736, which is a continuation-in-part of application No. 16/693,275, filed on Nov. 23, 2019, now Pat. No. 11,270,354.

(60) Provisional application No. 63/166,391, filed on Mar. 26, 2021, provisional application No. 63/154,357, filed on Feb. 26, 2021, provisional application No. 63/040,610, filed on Jun. 18, 2020, provisional application No. 63/025,287, filed on May 15, 2020, provisional application No. 63/022,190, filed on May 8, 2020, provisional application No. 62/994,219, filed on Mar. 24, 2020, provisional application No. 62/965,626, filed on Jan. 24, 2020, provisional application No. 62/963,568, filed on Jan. 21, 2020, provisional application No. 62/963,379, filed on Jan. 20, 2020, provisional application No. 62/963,368, filed on Jan. 20, 2020, provisional application No. 62/940,607, filed on Nov. 26, 2019, provisional application No. 62/904,568, filed on Sep. 23, 2019, provisional application No. 62/883,360, filed on Aug. 6, 2019, provisional application No. 62/879,862, filed on Jul. 29, 2019.

(51) Int. Cl.
| | |
|---|---|
| *H04N 21/462* | (2011.01) |
| *H04W 4/12* | (2009.01) |
| *H04W 4/80* | (2018.01) |

(56) References Cited

U.S. PATENT DOCUMENTS

| | | | |
|---|---|---|---|
| 7,030,149 | B2 | 4/2006 | Chang et al. |
| 7,783,030 | B1 | 8/2010 | Bruening et al. |
| 7,899,177 | B1 | 3/2011 | Bruening et al. |
| 8,060,565 | B1 | 11/2011 | Swartz |
| 8,161,118 | B2 | 4/2012 | Maj et al. |
| 8,180,630 | B2 * | 5/2012 | Goud .................. G06F 40/242 |
| | | | 704/10 |
| 9,256,447 | B2 | 2/2016 | Gujarathi et al. |
| 9,740,740 | B1 * | 8/2017 | Jett ......................... G06F 1/163 |
| 9,794,762 | B2 | 10/2017 | Bakos et al. |
| 10,484,435 | B2 | 11/2019 | Allen |
| 10,943,317 | B2 | 3/2021 | Jackson et al. |
| 2005/0004840 | A1 | 1/2005 | Wanninger |
| 2005/0288955 | A1 * | 12/2005 | Lewiss-Hachmeister ................... G06Q 40/03 |
| | | | 705/38 |
| 2006/0153072 | A1 | 7/2006 | Bushmitch et al. |
| 2006/0223502 | A1 * | 10/2006 | Doulton .................. H04W 4/16 |
| | | | 455/413 |
| 2006/0225064 | A1 | 10/2006 | Lee et al. |
| 2006/0282904 | A1 * | 12/2006 | Lawrence ............ G06Q 20/123 |
| | | | 726/27 |
| 2007/0038516 | A1 | 2/2007 | Apple et al. |
| 2007/0054678 | A1 * | 3/2007 | Doulton ............ H04M 3/42382 |
| | | | 455/466 |
| 2007/0078656 | A1 * | 4/2007 | Niemeyer ............... G10L 13/00 |
| | | | 704/260 |
| 2007/0232347 | A1 * | 10/2007 | Persson .................. H04L 51/222 |
| | | | 455/550.1 |
| 2007/0244951 | A1 | 10/2007 | Gressel et al. |
| 2008/0021767 | A1 * | 1/2008 | Benson .............. G06Q 30/0201 |
| | | | 705/7.29 |
| 2008/0025481 | A1 * | 1/2008 | Koch ................ H04M 3/53391 |
| | | | 379/88.21 |
| 2008/0042423 | A1 | 2/2008 | Roberts et al. |
| 2008/0063178 | A1 | 3/2008 | Paden et al. |
| 2008/0119174 | A1 * | 5/2008 | Farkas .................... G06Q 30/02 |
| | | | 455/414.1 |
| 2008/0133678 | A1 | 6/2008 | Woodham et al. |
| 2008/0155647 | A1 | 6/2008 | Miyawaki et al. |
| 2008/0248815 | A1 * | 10/2008 | Busch ..................... H04L 67/52 |
| | | | 455/456.5 |
| 2010/0121688 | A1 | 5/2010 | Marsch et al. |
| 2011/0307355 | A1 | 12/2011 | Khalil |
| 2013/0066677 | A1 | 3/2013 | Killoh |
| 2013/0144961 | A1 | 6/2013 | Park et al. |
| 2013/0179264 | A1 | 7/2013 | Wilson |
| 2013/0268868 | A1 | 10/2013 | Stollberg et al. |
| 2013/0282834 | A1 | 10/2013 | Dempski et al. |
| 2013/0304604 | A1 * | 11/2013 | Hoffman ............ G06Q 30/0621 |
| | | | 705/26.5 |
| 2014/0257935 | A1 | 9/2014 | Killoh |
| 2014/0297786 | A1 | 10/2014 | Caskey et al. |
| 2015/0058232 | A1 | 2/2015 | Persinger et al. |
| 2015/0106308 | A1 | 4/2015 | Harrison et al. |
| 2015/0332418 | A1 | 11/2015 | Wilson et al. |
| 2016/0155149 | A9 | 6/2016 | Macartney-Filgate et al. |
| 2017/0048170 | A1 | 2/2017 | Smullen et al. |
| 2017/0091725 | A1 * | 3/2017 | Pesch ................... G06Q 20/102 |
| 2017/0128059 | A1 | 5/2017 | Coe et al. |
| 2017/0302618 | A1 | 10/2017 | Porika |
| 2018/0034888 | A1 | 2/2018 | Cohen et al. |
| 2018/0060914 | A1 | 3/2018 | Conrad et al. |
| 2018/0152299 | A1 | 5/2018 | Rossi |
| 2018/0152300 | A1 | 5/2018 | Rossi |
| 2018/0212904 | A1 | 7/2018 | Smullen et al. |
| 2019/0303778 | A1 | 10/2019 | Desai et al. |
| 2019/0317803 | A1 | 10/2019 | Maheshwari et al. |
| 2019/0347668 | A1 | 11/2019 | Williams et al. |
| 2019/0362416 | A1 * | 11/2019 | Pesch ..................... G06Q 30/08 |
| 2019/0370089 | A1 * | 12/2019 | Patton .................... G06F 9/542 |
| 2020/0374389 | A1 | 11/2020 | Costa |
| 2021/0035156 | A1 | 2/2021 | Doumar |
| 2021/0201897 | A1 | 7/2021 | Mital et al. |
| 2021/0357378 | A1 | 11/2021 | Urdiales et al. |
| 2022/0180874 | A1 | 6/2022 | Pugliese et al. |

* cited by examiner

Receive content related to a communication
901

Receive one or more rules related to the content
902

Generate an initiator ID for the content
903

Store the content, the rules, and the initiator ID
904

Generate an initiator linked to the initiator ID
905

Provide the generated initiator according to a desired implementation
906

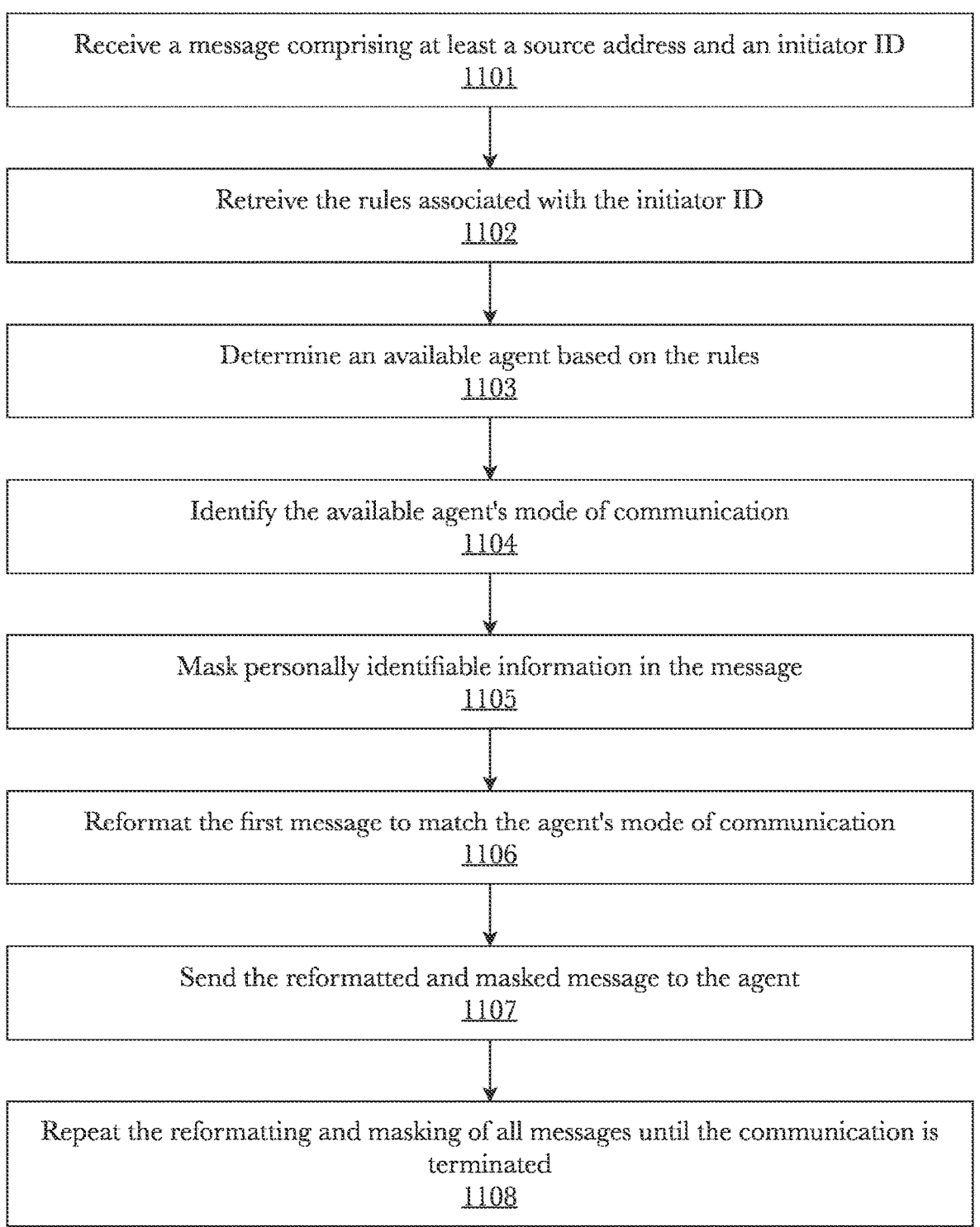

Receive a message comprising at least a source address and an initiator ID
1101

Retreive the rules associated with the initiator ID
1102

Determine an available agent based on the rules
1103

Identify the available agent's mode of communication
1104

Mask personally identifiable information in the message
1105

Reformat the first message to match the agent's mode of communication
1106

Send the reformatted and masked message to the agent
1107

Repeat the reformatting and masking of all messages until the communication is terminated
1108

Fig. 11

SYSTEM AND METHOD FOR LINK-INITIATED DYNAMIC-MODE COMMUNICATIONS

CROSS-REFERENCE TO RELATED APPLICATIONS

Priority is claimed in the application data sheet to the following patents or patent applications, each of which is expressly incorporated herein by reference in its entirety:

Ser. No. 17/360,731
Ser. No. 17/229,251
63/166,391
Ser. No. 17/209,474
Ser. No. 17/208,059
Ser. No. 17/191,977
Ser. No. 17/190,260
Ser. No. 17/153,426
62/965,626
62/963,368
62/963,379
63/040,610
63/025,287
63/022,190
62/994,219
63/154,357
Ser. No. 17/085,931
62/940,607
Ser. No. 16/693,275
62/963,568
62/883,360
62/879,862
62/904,568

BACKGROUND OF THE INVENTION

Field of the Art

The disclosure relates to the field of computer-based communication systems, and more particularly to the field of cross-multimedia communications and advertising.

Discussion of the State of the Art

Marketing campaigns, customer outreach, and customer service support all have at least two things in common-a desire to get and to keep the attention of a customer. However, keeping the attention of a customer is arguably the more difficult of the two. It is all too easy to create flashy and dazzling adverts that force a quick glance, but then getting a potential customer to follow-though and engage with a product or service is another thing. This also goes for customer service support. All to often it is difficult to find and get connected with the right service support agent, and that difficulty leads to frustration and customer churning. In addition to the previous points, there are a vast amount of form factors—e.g., flyers, billboards, online ads, etc.—across a business that are used to engage the customer which just adds to the confusion and management complexity.

For example, imagine a bus stop advertisement for a product. The ad will typically contain the product and the brand name, and maybe even a URL that is not complicated to remember, but not usually. Imagine a second example of a billboard ad for lawn care. That ad may have a phone number, URL, or just the business name, and each person viewing person is expected to make an effort later in the day, after he or she has probably forgotten what they saw earlier to engage with the lawn care company or remember to go and buy the product.

What is needed is a system and method that makes it extremely simple for a person to immediately engage with a product, service, or sales/support agent.

SUMMARY OF THE INVENTION

Accordingly, the inventor has conceived and reduced to practice, a system and method for a dynamic-link communication process between an electronic device and a target product or service by serving content or facilitating communication between two electronic devices. The first step is engagement by an electronic device with an initiator that is linked with a specific product or service that triggers a text message to auto-populate on the electronic device. The message comprising metadata about the specific product or service. The second step is for the electronic device to send the auto-populated message to a message gateway thus initiating the communication between the electronic device and a product or service. The message gateway works with a management service and one or more databases to send content back to the electronic device or to facilitate and convert messages between the electronic device and a second electronic device, the second electronic device associated with a product or service.

According to a first preferred embodiment, a system for link-initiated dynamic-mode communications is disclosed, comprising: A dynamic-link communication platform comprising a first plurality of programming instructions stored in a memory of, and operating on a processor of, a first computing device, wherein the first plurality of programming instructions, when operating on the processor, causes the first computing device to: couple stored media content from one or more databases to an initiator ID, wherein the initiator ID is an identification marker unique to the stored media content, and wherein the media content comprises a call-to-action; embed the initiator ID into an initiator, wherein the initiator is an interactable object and when interacted with by a mobile computing device, is configured to auto-populate a text message on the mobile computing device; receive the text message from the mobile computing device, the message comprising the initiator ID and metadata about the mobile device; retrieve a rule associated with the initiator ID; and execute the instructions contained in the rule.

According to a second preferred embodiment, a method for link-initiated dynamic-mode communications is disclosed, comprising the steps of: coupling stored media content from one or more databases to an initiator ID, wherein the initiator ID is an identification marker unique to the stored media content, and wherein the media content comprises a call-to-action; embedding the initiator ID into an initiator, wherein the initiator is an interactable object and when interacted with by a mobile computing device, is configured to auto-populate a text message on the mobile computing device; receiving the text message from the mobile computing device, the message comprising the initiator ID and metadata about the mobile device; retrieving a rule associated with the initiator ID; and executing the instructions contained in the rule.

According to various aspects, the initiator comprises an interactable link to an Internet resource, a scannable QR code, or an NFC beacon; the call-to-action is information about a product, information about a service, a request to contact an agent, or some combination thereof; wherein the instructions further comprise the steps of: retrieving the stored media content associated with the initiator ID; and sending the stored media content to the mobile computing device; wherein the instructions further comprise the steps of: determining an available agent; masking personally identifiable information in the text message; sending the masked text message to the agent; facilitating the sending and receiving of any further messages between the agent and the mobile computing device; and repeating the masking of all messages facilitated between the agent and the mobile computing device until termination of the communication; and wherein the instructions further comprise the steps of: determining an available agent; identifying the available agent's preferred mode of communication; masking personally identifiable information in the text message; reformatting the text message to match the agent's mode of communication, wherein the agent's mode of communication is different than the text message's original mode of communication; sending the reformatted and masked text message to the agent; facilitating the sending and receiving of any further messages between the agent and the mobile computing device; and repeating the masking and reformatting of all messages facilitated between the agent and the mobile computing device until termination of the communication.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 11 is a flow diagram illustrating an exemplary method for facilitating multimodal communications.

DETAILED DESCRIPTION OF THE INVENTION

Figure 1:
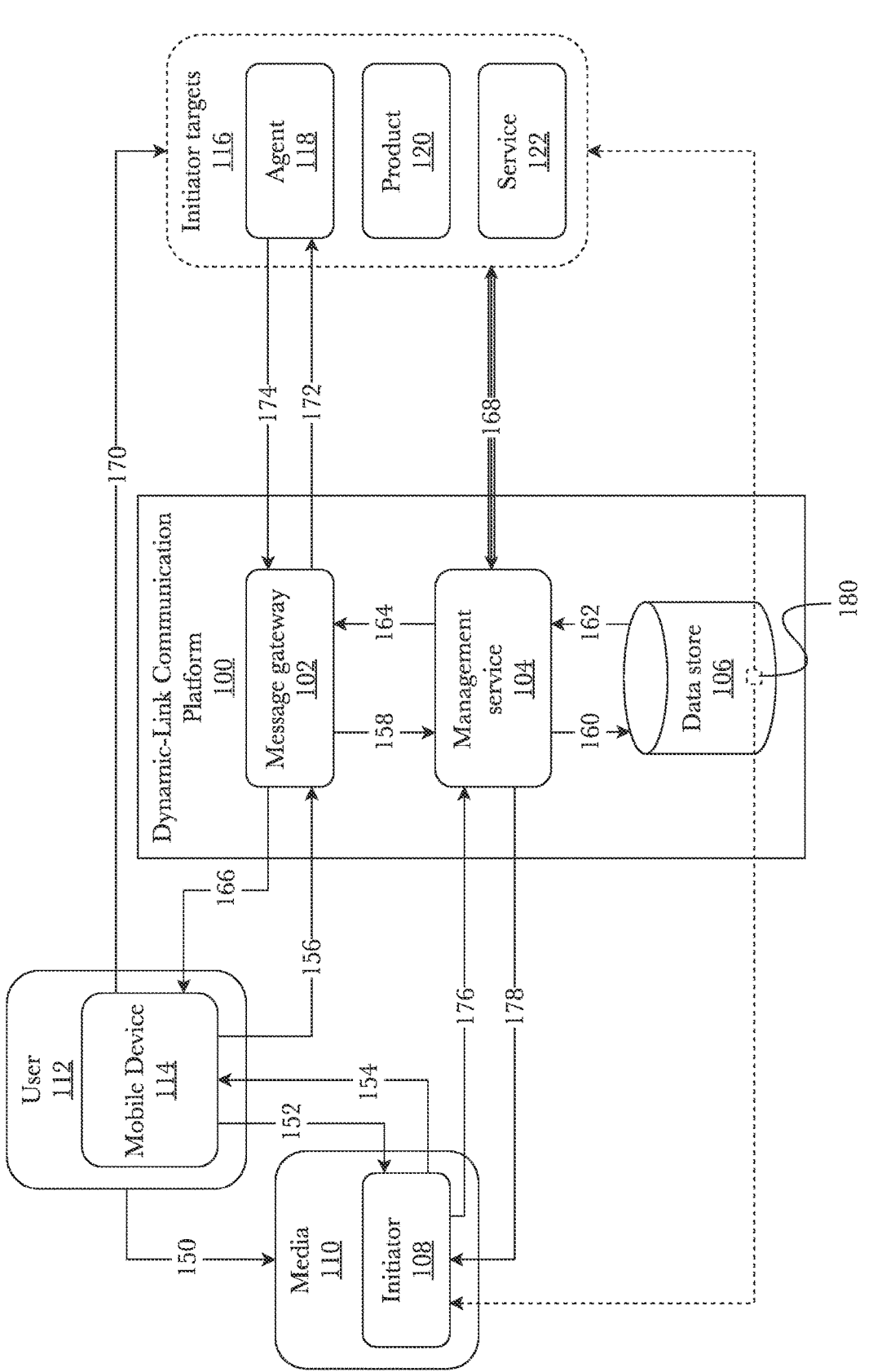
FIG. 1 is a block diagram illustrating an exemplary system architecture for a dynamic-link communication platform.

The inventor has conceived, and reduced to practice, a system and method for a dynamic-link communication process between an electronic device and a target product or service by serving content or facilitating communication between two electronic devices. The first step is engagement by an electronic device with an initiator that is linked with a specific product or service that triggers a text message to auto-populate on the electronic device. The message comprising metadata about the specific product or service. The second step is for the electronic device to send the auto-populated message to a message gateway thus initiating the communication between the electronic device and a product or service. The message gateway works with a management service and one or more databases to send content back to the electronic device or to facilitate and convert messages between the electronic device and a second electronic device, the second electronic device associated with a product or service.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture for a dynamic-link communication platform 100. Dynamic-link communication platform 100 links an initiator 108 with some type of content or call-to-action associated with a target product or service 116. An initiator 108 may take on many forms, a preferred form being a QR code, however other forms are anticipated in a non-exhaustive list in FIG. 8. The content served may also take many forms, a preferred form being a text or URL associated with a product 120 or service 122, however other forms are anticipated in a non-exhaustive list in FIG. 6. Actions are typically, but not limited to, communicating with some type of agent 118, be it a sales agent, technical support agent, or other types of representatives.

Initialization of dynamic-link communication platform 100 comprises storing content and rules associated with a product 120 or service 122 in some form of computer memory 106, i.e., in a database, federated data store, or distributed ledger, etc. The content and rules are assigned an initiator ID that is unique to that product 120 or service 122 and everything related to that product 120 or service 122 (e.g., content, rules, initiator ID, etc.) is called a campaign 180. The initiator ID may be autogenerated by an algorithm, or taken sequentially from a list, or other methods known to those in the art. Additionally, neither the content nor the rules together are a requirement, but each campaign must have at least one or the other or both. For example, a campaign for a product sold online may have no rules and the only content is a URL to the product page for that product. Or in another example, a marketing campaign attempting to get users 112 to speak to a sales representative may have only a set of rules that forward the user's 112 phone number to a phone number of the business. However, in some situations, there may be content and rules, whereby it may be possible to only forward the content based on some part of the user's 112 metadata embedded in the auto-populated message.

Other rules may comprise routing instructions or routing logic and may further use Artificial Intelligence ("AI") techniques known to those skilled in the art including deep learning algorithms and incorporate data resources as listed in previous paragraph along with an array of other factors including but not limited to time-of-day, day-of-week, store hours, resource availability, service level requirements, previous customer interaction and transactions, customer tiering structure, data from $3^{rd}$ party systems including but not limited to CRM systems, location-based services, weather-services and so forth.

With a unique initiator ID for a product 120 or service 122 in place, an initiator 108, such as a QR code, may be generated. It is not necessary to always generate the initiator 108 with a dynamic-link communication platform 100. According to one embodiment, initiators 108 may also be received alongside the content and rules. Generated initiators 108 may be sent, forwarded, printed, mailed, or hosted on some form of media 110. Media 110 in this sense is referring to the many forms that an initiator may be placed. A non-exhaustive list includes printed materials such as billboards, posters, and flyers; and electronic means such as online advertisements, embedded advertisements, URLs, push notifications, streaming media, etc.

With the dynamic-link communication platform 100 initialized, a user 112 will observe 150 media 110 with an initiator 108, use his or her device—such as a mobile device 114—to engage 152 with an initiator 108, for example scanning a QR code, which will trigger the device 114 to auto-populate a text message 154. The user 112 will simply press the send key/button to send the message 156. In the case the initiator 108 is a QR code, then the destination of the message and other data may be embedded in the QR code such that the embedded data is then transferred along with the message to the dynamic-link communication platform 100 so that the dynamic-link communication platform 100 knows the context in which the message was sent. In almost every case there may be a way two derive context from a message. Take for example, three billboards all directed to the same product 120/campaign but each containing a different phone number, where the phone number is the initiator 108 and shares the same initiator ID. In this case a user will dial the phone number and be returned the content (e.g., a text message with the product information) and the number that was dialed gives context as to the location of the billboard and the user 112. In a case where the media 110 does not allow for context, but the initiator 108 has Internet access, the initiator 108 may communicate 176/178 with the management service component 104 of a dynamic-link communication platform 100 in order to provide context as well as deliver and confirm compliance with rules if applicable.

The message sent 156 from the device 114 is received by a message gateway 102 and forwarded 158 onto a management service 104. The message gateway 102 receives and sends messages from various modes of communication, e.g., text, email, voice, and other protocols. The initiator ID contained in the message is used to query 160 a data store 106 which will return 162 any content and rules associated with that initiator ID. Upon compliance with any rules, and if there is content to be delivered back to the device 114, then the content is sent 164 to the message gateway 102 for sending 166 back to the device 114. If the message was a request to communicate with an agent 118, then upon compliance with any rules, the message or content will be sent to the message gateway 102 for delivery 172 to the agent 118. The agent 118 if applicable, will send a return message 174, and that return message will again go to the management service 104 for rule compliance before being delivered to the device 114. Some content to be delivered to the device will contain external links 170 to the products 120 and services 122. Content, rules, and provided initiators 108 may be dynamically updated via communication lines 168 with the initiator targets 116. For example, if the URL to a product changes, the product owner may push updated content to replace the old content in the data store 106.

Customers/users and their devices 114, agents 118, 177 and their business user mobile device(s), other business user device(s), and TCPA compliant mobile device(s) used by agents 118, may connect to a dynamic-link communication platform 100, typically via a cellular phone network, although connections may be made through other means, as well, such as through the Internet via a Wi-Fi router for example. Similarly, devices may connect to over a Local Area Network ("LAN") or Wide Area Network ("WAN"), the Internet, a direct physical connection to another device, or some other network connection. Dynamic-link communication platform system 100 may connect to $3^{rd}$ party or external systems or components, such as Customer Relationship Management ("CRM") systems, Private Branch Exchange ("PBX"), traditional telephony call center agents, voicemail systems, and so forth, through 3rd party data gateway.

Figure 2:
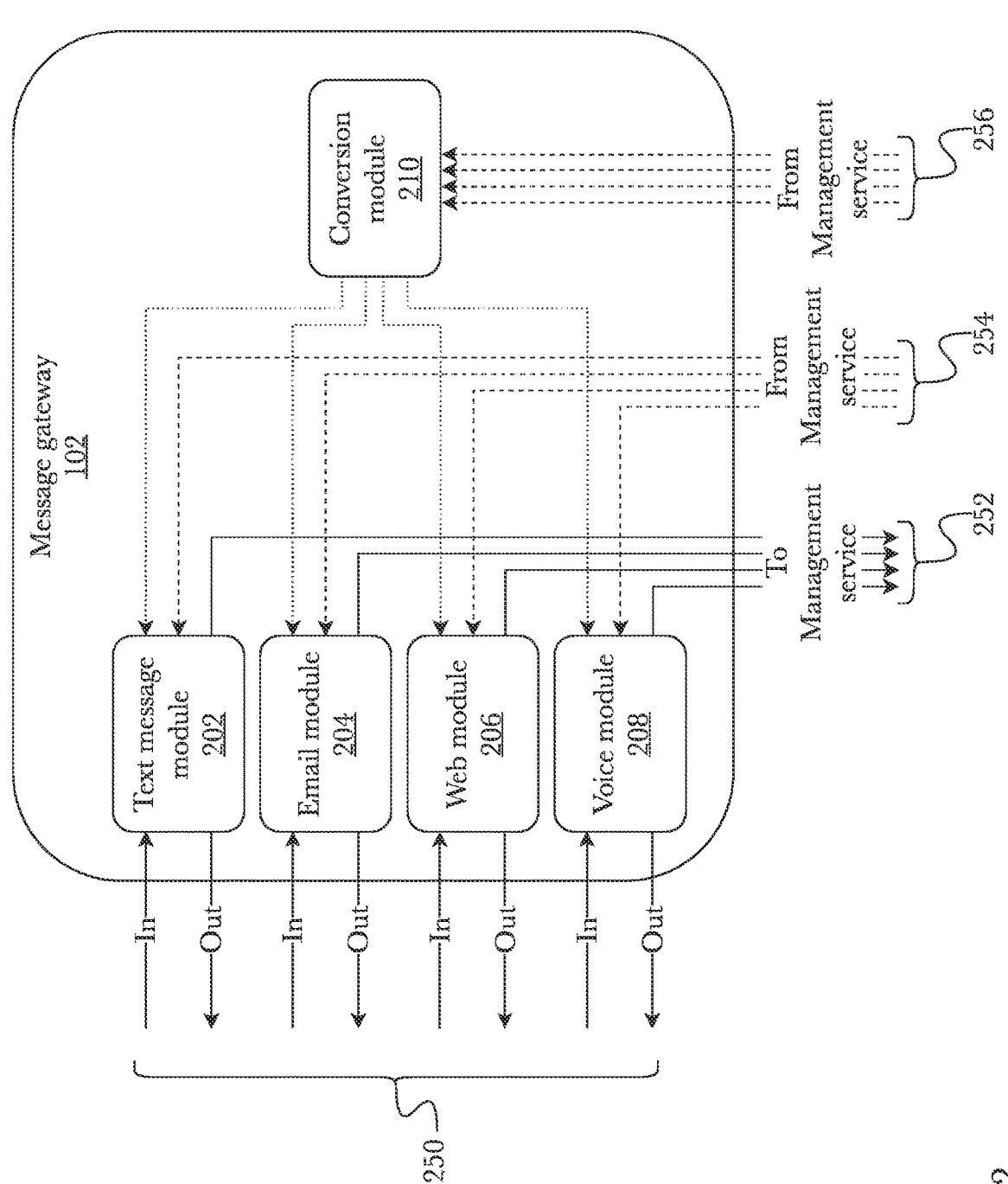
FIG. 2 is a block diagram illustrating an exemplary architecture for message gateway.

FIG. 2 is a block diagram illustrating an exemplary architecture for message gateway. The message gateway 102 may comprise various modules 202-208 which send and receive 250 different modes of communication. A conversion module 210 may be implemented which is dedicated to converting between different modes of communication. However, the arrangement of these modules and their inherent functions need not be arranged in the manner illustrated in FIG. 2. Another anticipated embodiment employs third-party gateway services where and if possible, such as an SMS-to-email gateway, however it may be more efficient to centrally perform the conversions, especially with regard to privacy.

Messages received 250 by the modules are sent to management service 252. The returned content or response messages from the management service may already be formatted in the proper format for the respective module 254. Returned content or response messages not properly formatted 256 may get formatted by the conversion module before going out to the proper module 202-208.

Figure 3:
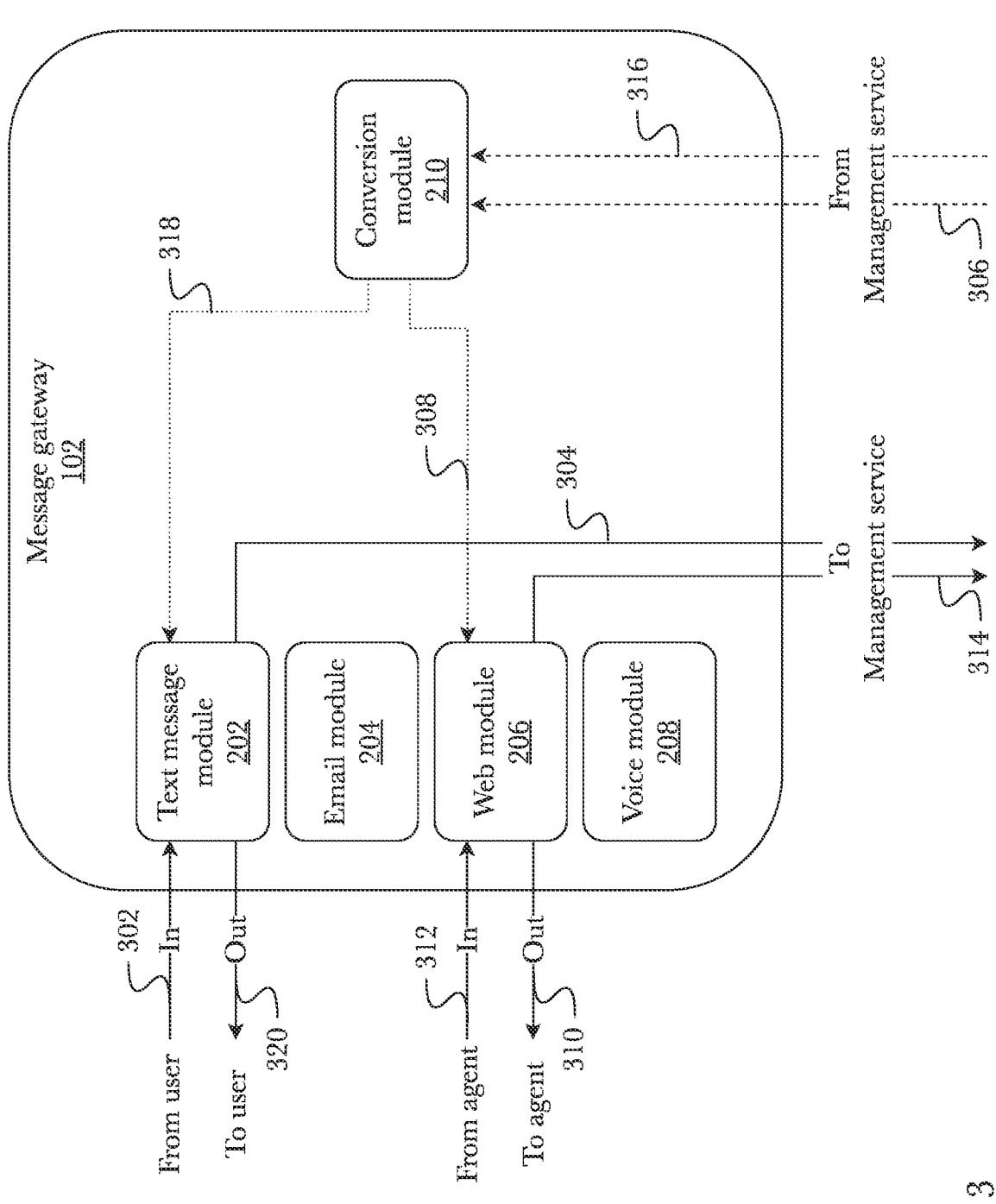
FIG. 3 is a block diagram illustrating an exemplary use of a message gateway.

FIG. 3 is an example of a user engaging with an initiator that is intended to connect the user with a sales agent using a web-enabled chat interface. A user will interact with an initiator and then send the generated message which will be received 302 by a text message module 202. The text message module 202 may contain instructions to send and receive wireless protocols typically used for mobile devices such as SMS, MMS, iMessage, RCS, etc. The message is sent to the management service 304 where the initiator ID from the message will identify the campaign and subsequently at least one or more agents to query if they may respond to the request. The rules of the campaign may set forth what content the message to the agent contains. For example, the first message may just contain a query to approve or deny the request. According to another embodiment, the original message plus any metadata about the user or request may be slotted into an agent's queue. Many possibilities exist as to what the messages may contain and are not limited to the examples set forth herein. Irrespective of what the messages may contain, a message is sent to an agent 308/310 via the web module 206, however not before the text message is converted into the appropriate format 306 for the web module 206. The response from the agent 312 is sent to the management service for rule compliance 314 and then back 316 to the message gateway 102 conversion module 210 so that it may be converted into a text format to be set to the user 318/320.

Figure 4:
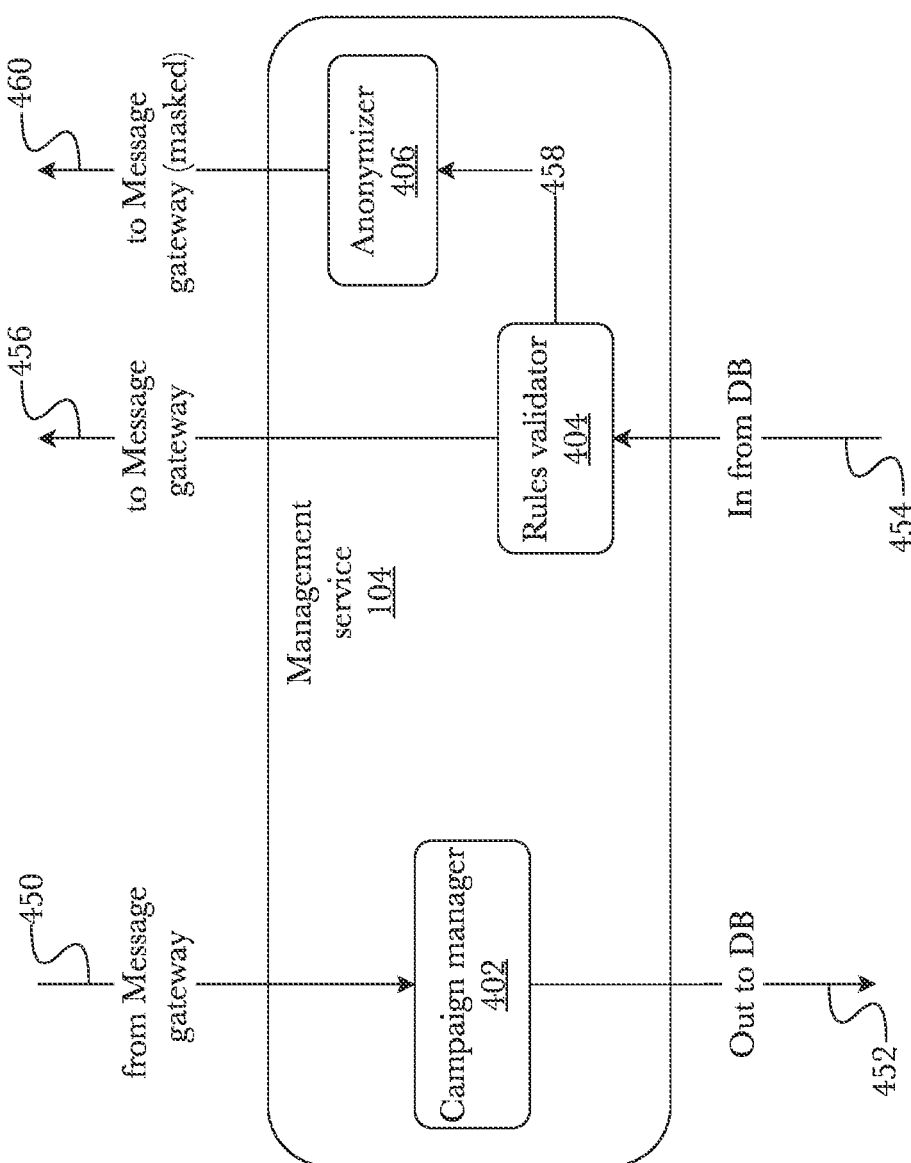
FIG. 4 is a block diagram illustrating an exemplary architecture for a management service.

FIG. 4 is a block diagram illustrating an exemplary architecture for a management service 104. Messages from the message gateway are received 450 by the management service 104 and a campaign manager 402 uses the message initiator ID to retrieve the associated content and rules from one or more databases 452/454 and sends the rules to a rules validator 404. If there are no rules and only content to be served, then the content will simply be sent out to the message gateway 456. If a campaign from the one or more databases does contain one or more rules however, the rules validator 404 ensures that all the requirements of the campaign are met before sending the content or executing a specific action is performed. One example is that a rule may dictate that the message be stripped of private information before it is forwarded or used, and in such a case, the message will be sent to an anonymizer 406 before the message is sent 458 to the message gateway 460. The anonymizer 406 removes personally identifiable information (PII) from messages using machine learning algorithms such as natural language processing or natural language reasoning. Rules may go as far as being employed to prescreen the source of the message using the metadata embedded into the message as a way to discriminate whether or not the contents of the campaign may be allowed to be sent to the message sender.

Figure 5:
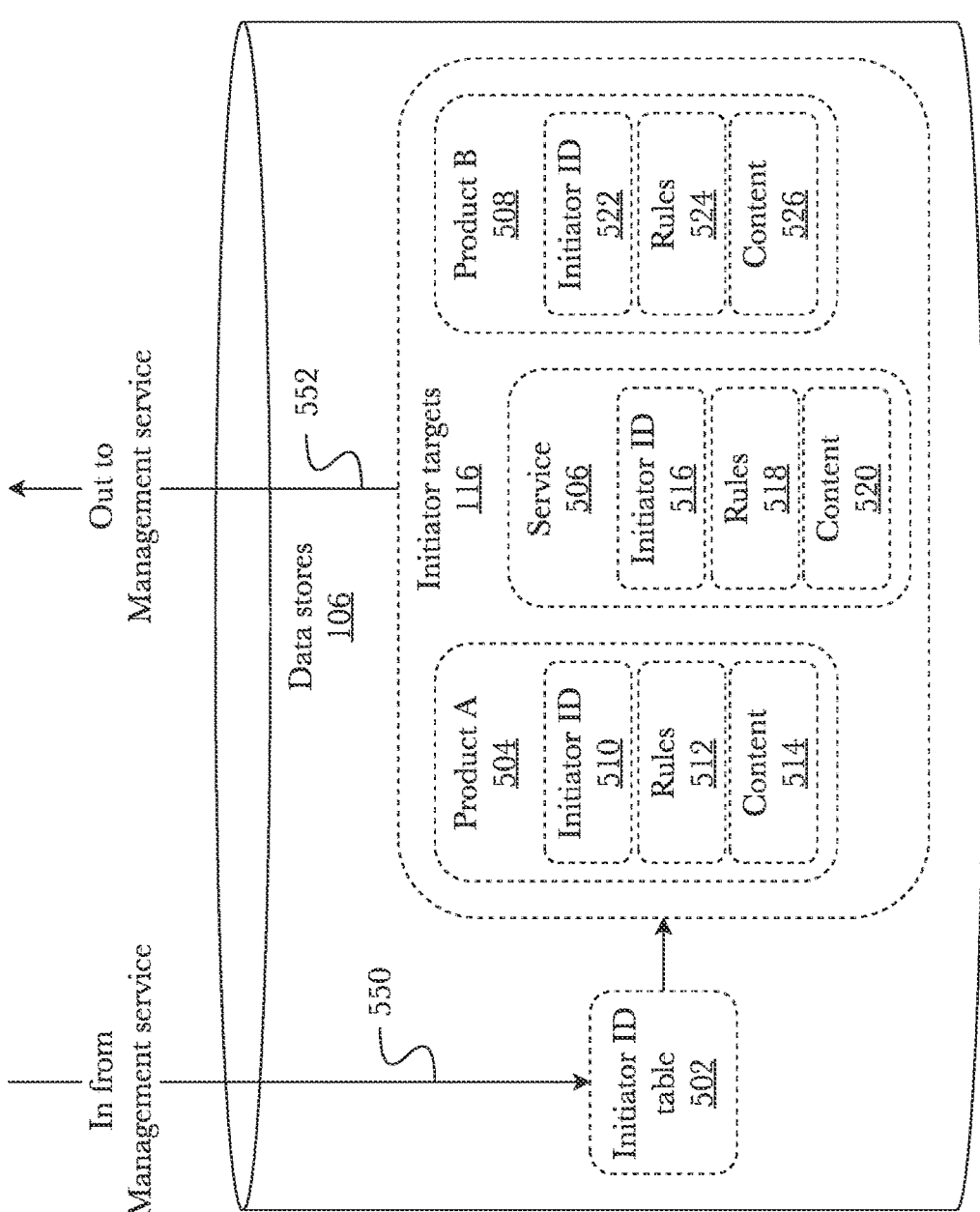
FIG. 5 is a block diagram illustrating exemplary data within one or more data stores.

FIG. 5 is a block diagram illustrating exemplary data within one or more data stores 106. This diagram illustrates an exemplary logical representation of one way to organize and store data associated with an initiator in one or more data bases. In this arrangement an initiator ID table 502 stores a list of initiator IDs, each of which are linked with a memory address associated with each initiator target 116, i.e., campaign 504-508, in the data store. In this way, content and rules may be efficiently retrieved from the management service 550/552. According to this embodiment, each campaign 504-508 has at least their own set of rules 512/518/524, content 514/520/526, and an initiator ID 510/516/522.

Database(s) 106 may take the form of a managed or unmanaged database, document-oriented database system, or a Structured Query Language ("SQL") database. Examples of types of database software that may operate include MYSQL™, ORACLE DATABASE™, MON- GODB™, and others. It may exist as a distinct physical device or be operating on another computing device that may perform other functions aside from operating, hosting and serving the database 106. If it is a distinct physical device, the database may be connected over a LAN or WAN, the Internet, a direct physical connection to another device, or some other network connection.

Figure 9:
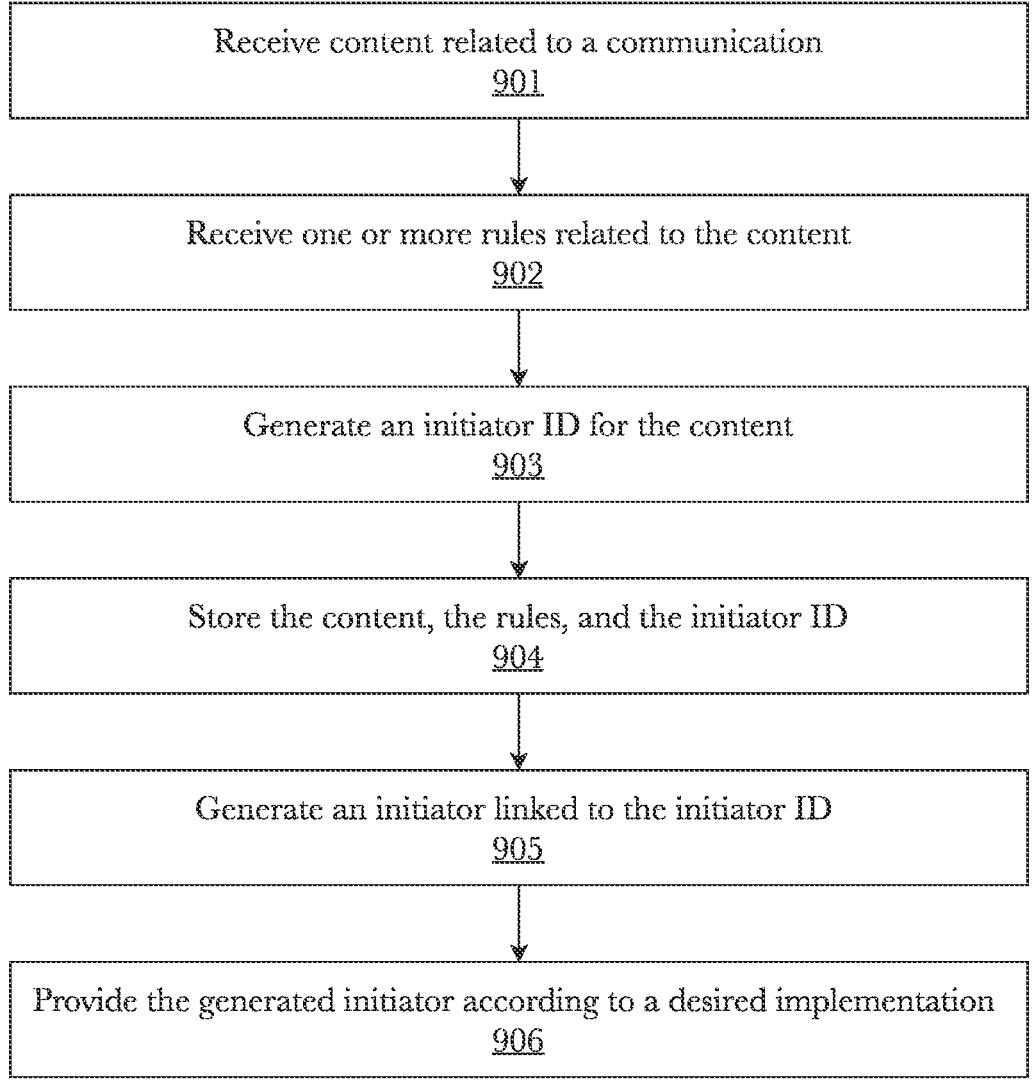
FIG. 9 is a flow diagram illustrating an exemplary method for initializing a dynamic-link communication platform.

FIG. 9 is a flow diagram illustrating an exemplary method for initializing a dynamic-link communication platform. Regarding the steps in this diagram, there is no strict requirement for the steps to be in this particular order. For example, content and rules may be received at the same time and stored before the initiator ID is generated. It will be appreciated by those skilled in the art that the general process is to populate a database with the content to be served, the rules related to how that content is served and to whom, and then to generate and link an initiator and initiator ID such that it may actually be served.

In a first and second step 901/902 content and one or more rules related to the content are received. In a third step 903, an initiator ID is generated or retrieved for the campaign, where the campaign is all of the data associated with that particular product or service. Initiator IDs may be issued sequentially or according to an algorithm, and the initiator ID's may also be used to identify campaigns, if so desired. In a fourth step 904, the content, rules, and initiator ID are stored in a database as a campaign. In a fifth step 905, an initiator is generated according to the provisions of the campaign. It is also anticipated that an initiator does not necessarily have to be generated, but may also be received along with the content and rules. It should be understood that whether an initiator is generated or received, it is inherently linked with the initiator ID of the associated campaign. In a six step 906, the initiator is deployed according to the stipulations of the campaign. It is anticipated that there may be many initiators taking various forms of which all link to one initiator ID.

Figure 10:
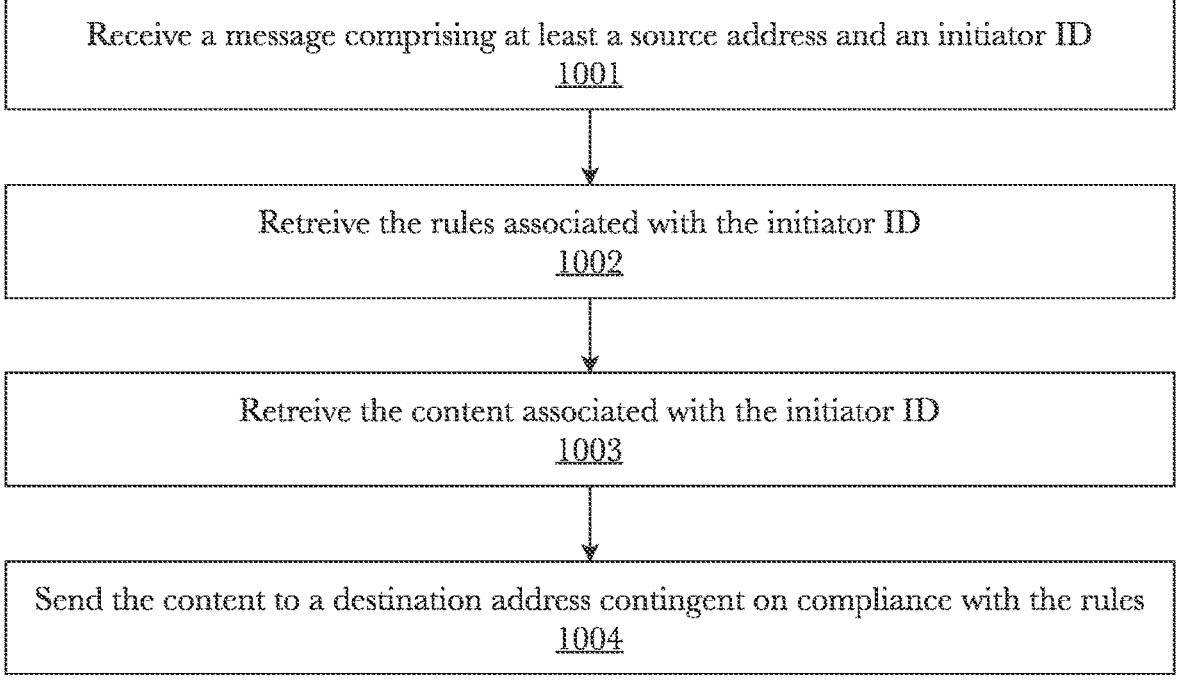
FIG. 10 is a flow diagram illustrating an exemplary method for implementing a dynamic-link communication platform.

FIG. 10 is a flow diagram illustrating an exemplary method for implementing a dynamic-link communication platform. In a first step 1001, a message is received comprising at least the originating source address and an initiator ID. In a second step 1002, rules associated with the initial ID are retrieved. In a third step 1003, content associated with the initiator ID is retrieved. In a fourth step 1004, the content is sent or the action triggered by the rules is executed, only upon compliance with the rules associated with that campaign.

FIG. 11 is a flow diagram illustrating an exemplary method for facilitating multimodal communications. In a first step 1101, a message comprising at least an originating source address and an initiator ID is received. In this case, the campaign-via the initiator-generating the message is intended to initiate a communication between the user and an agent. More particularly, initiate and facilitate a privacy-compliant communication between a user's device and an agent's device. In a second step 1102, the initiator ID is used to retrieve the rules for the campaign. In a third step 1103, the rules are used to determine which agent contact and when. In a fourth step 1104, the selected agents mode of communication is identified. Additionally, in this scenario, the motive communication of the user and the motive communication of the agent or not the same. In a fifth step 1105, personally identifiable information is masked or removed in the message received in step 1101. In a sixth step 1106, the message received in step one 1101 is reformatted to match the agent's mode of communication. In a seventh step 1107, the masked and reformatted message is sent to the agent. In an eighth step 1108, all subsequent messages of the communication between the user's device and the agent's device are formatted and masked appropriately until the communication is terminated.

Detailed Description of Exemplary Aspects

Figure 6:
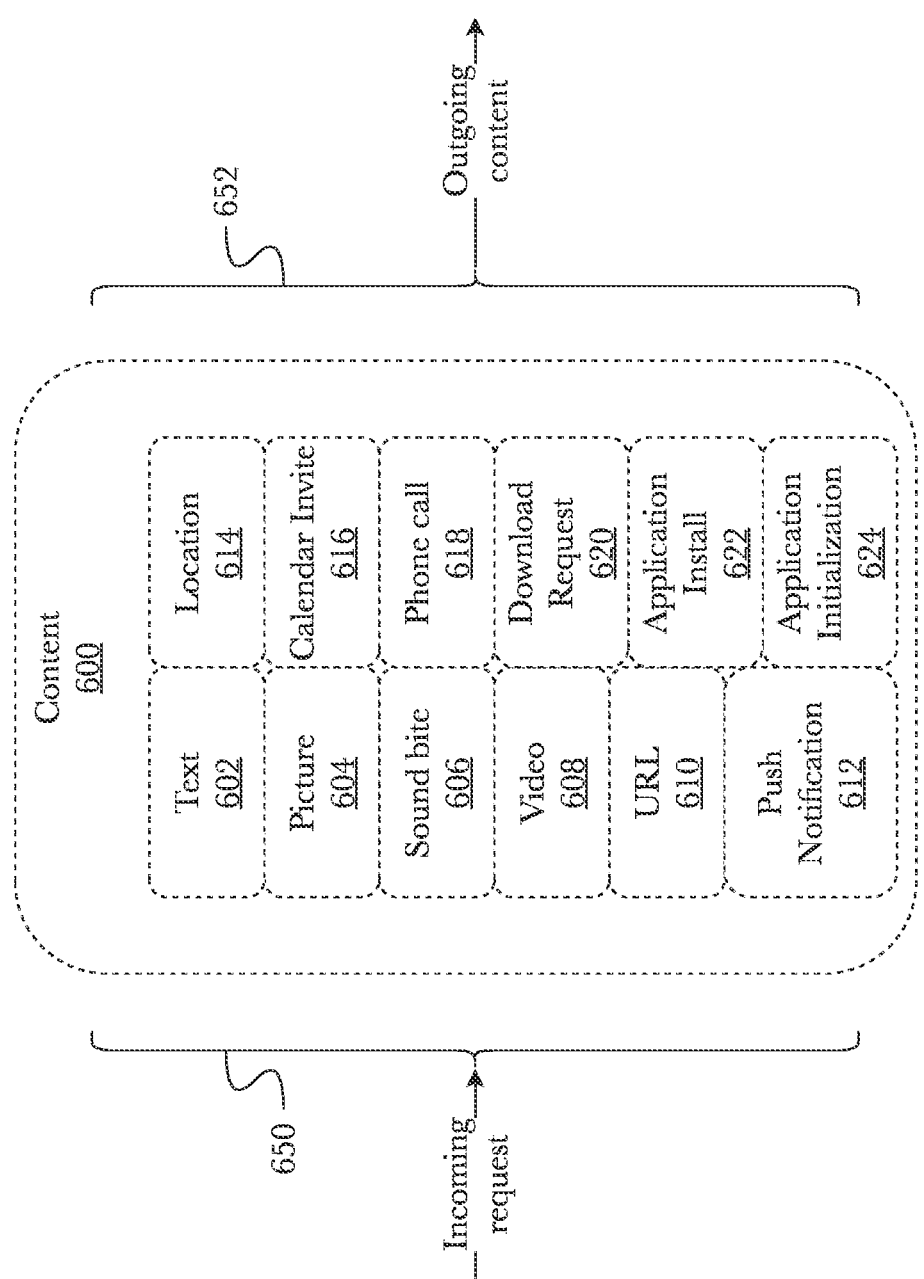
FIG. 6 is a block diagram illustrating exemplary content that may be served by a dynamic-link communication platform.

FIG. 6 is a block diagram illustrating exemplary content 600 that may be served 650/652 by a dynamic-link communication platform. Content that may be stored and served via a dynamic-link communication platform may comprise text 602, pictures 604, sound bites 606, videos 608, URLs 610, push notifications 612, location data 614, calendar invites 616, phone calls 618, download requests 620, application install request 622, and application initializations 624. Much of this content may be sent over MMS or other messaging services, attached to emails, or hosted in the cloud that may be linked in emails and texts, or hosted elsewhere and sent via URL's, among many other possible combinations known in the art.

Figure 7:
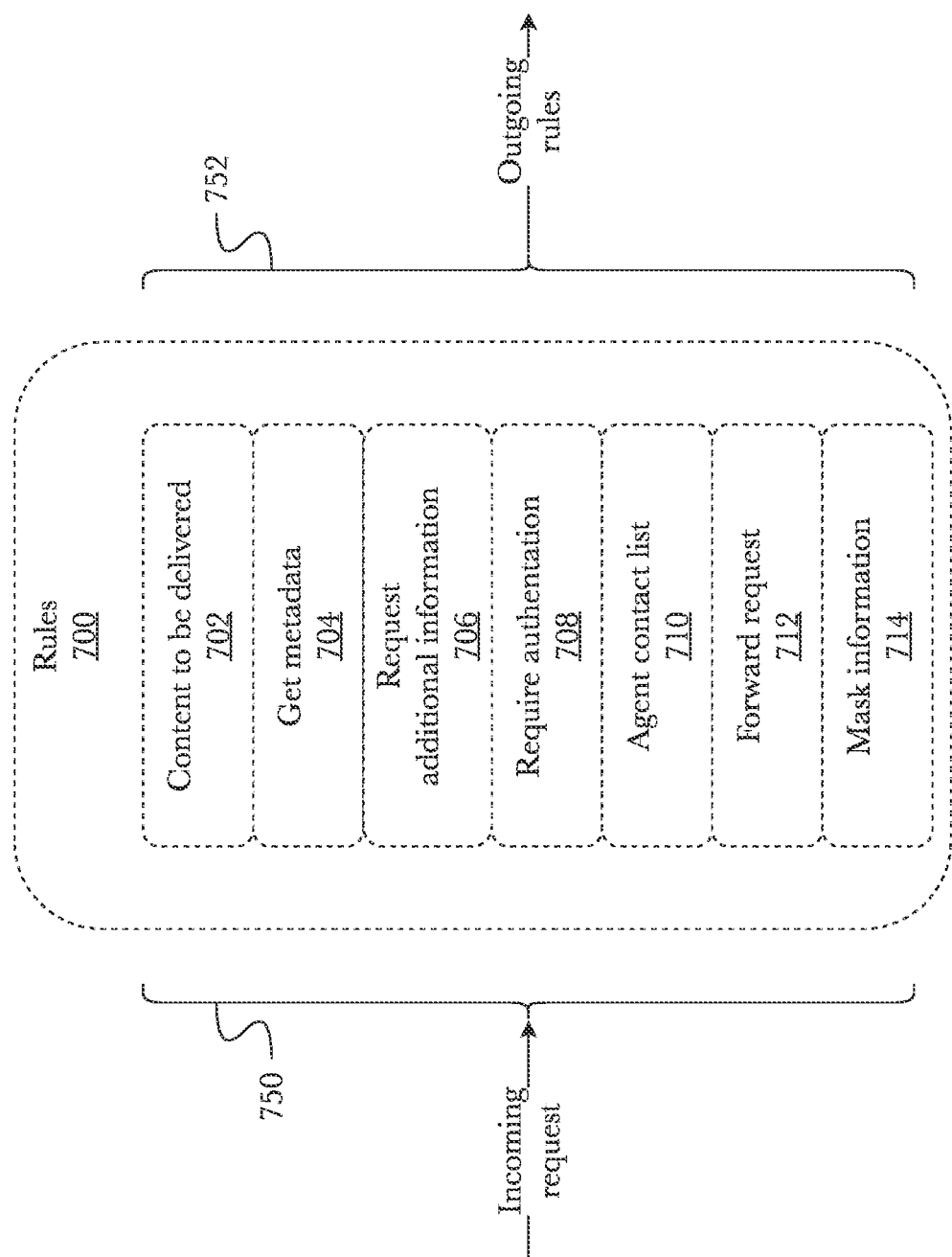
FIG. 7 is a block diagram illustrating exemplary rules that may be used by a dynamic-link communication platform.

FIG. 7 is a block diagram illustrating exemplary rules 700 that may be used by a dynamic-link communication platform. A non-exhaustive list of exemplary rules 752 that may be used against an incoming request 750 comprises: what content may be delivered 702, what kind of metadata to retrieve from the device 704, whether or not to send subsequent messages to the device requesting additional information 706, and whether or not the content requires authentication 708. Rules may be an algorithm comprising a list of agents such that the algorithms perform a round-robin style query to find an available agent, and other like algorithms 710. Rules may simply forward messages to a system, device, or agent 712. Other rules may require that certain information be masked for privacy and regulatory compliance 714.

Figure 8:
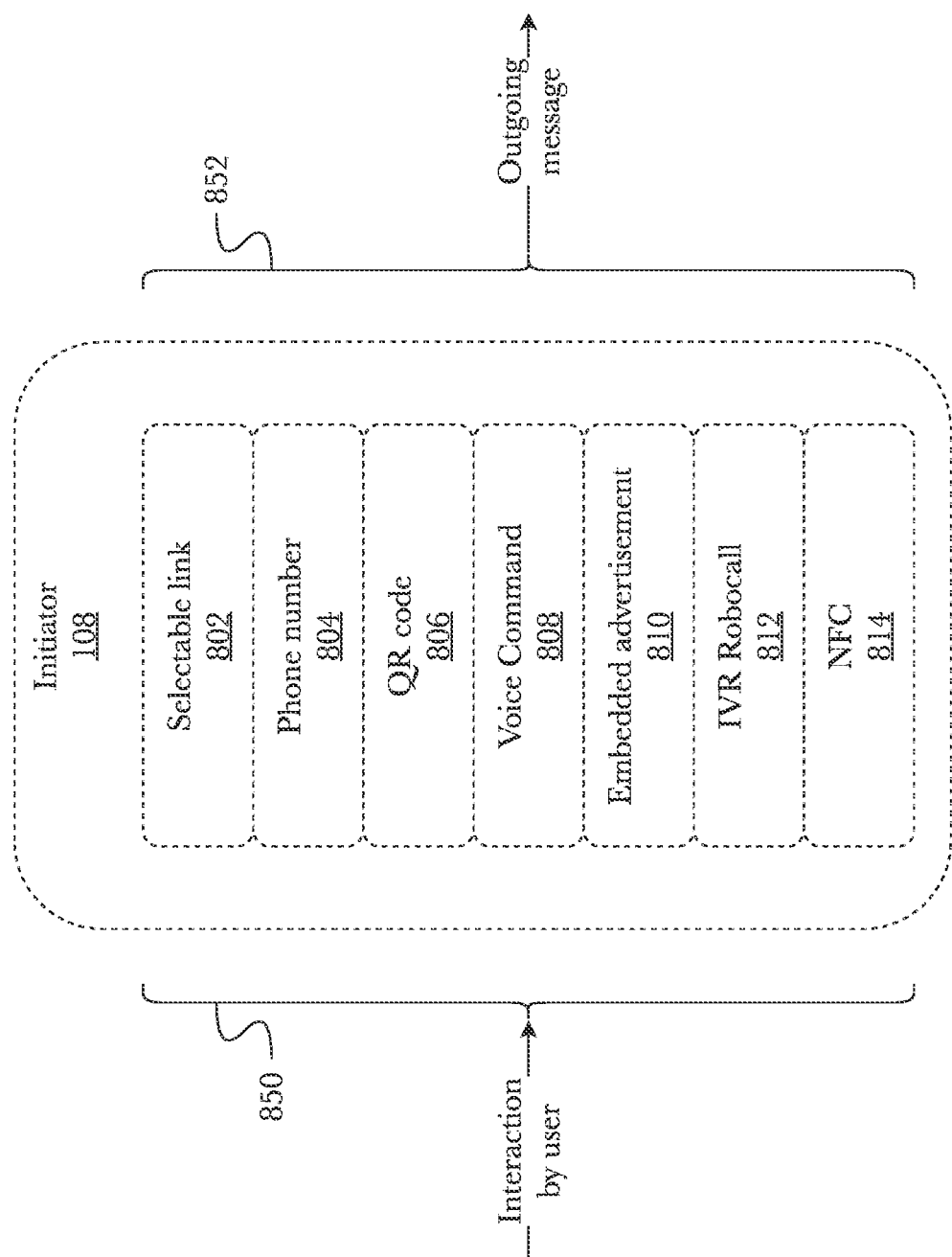
FIG. 8 is a block diagram illustrating exemplary initiators used to facilitate dynamic-link communications.

FIG. 8 is a block diagram illustrating exemplary initiators 108 used to facilitate dynamic-link communications. As illustrated by the diagram and the many initiator forms 802-814, it can be seen that an initiator 108 may take the form of anything that allows the user to interact 850 with the initiator 108 such that a device used to engage with the initiator can be commanded to auto-populate a message on the device 852. Tappable content on a mobile device or clickable links from a desktop for laptop computer may be used 802. Phone numbers on a printed advertisement can be dialed by the user in which an automated system on the other end of the line automatically responds with a text message to the calling device 804. QR codes are suited very well for this purpose as they may embed a plurality of information pertinent to efficient two-way communications 806. Another example may be a voice command that may be displayed to a user such that the user may say the voice command to a virtual assistant 808 on his or her device to initiate the communication. According to another embodiment, a purpose-built application for a dynamic-link communication platform may comprise its own virtual assistant and may also add increased functionality to a dynamic-link communication platform system. Advertisements embedded within applications and software programs 810, interactive voice response robocalls 812, and near field communication technologies 814 are all other examples that may be used as initiators 108.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 12:
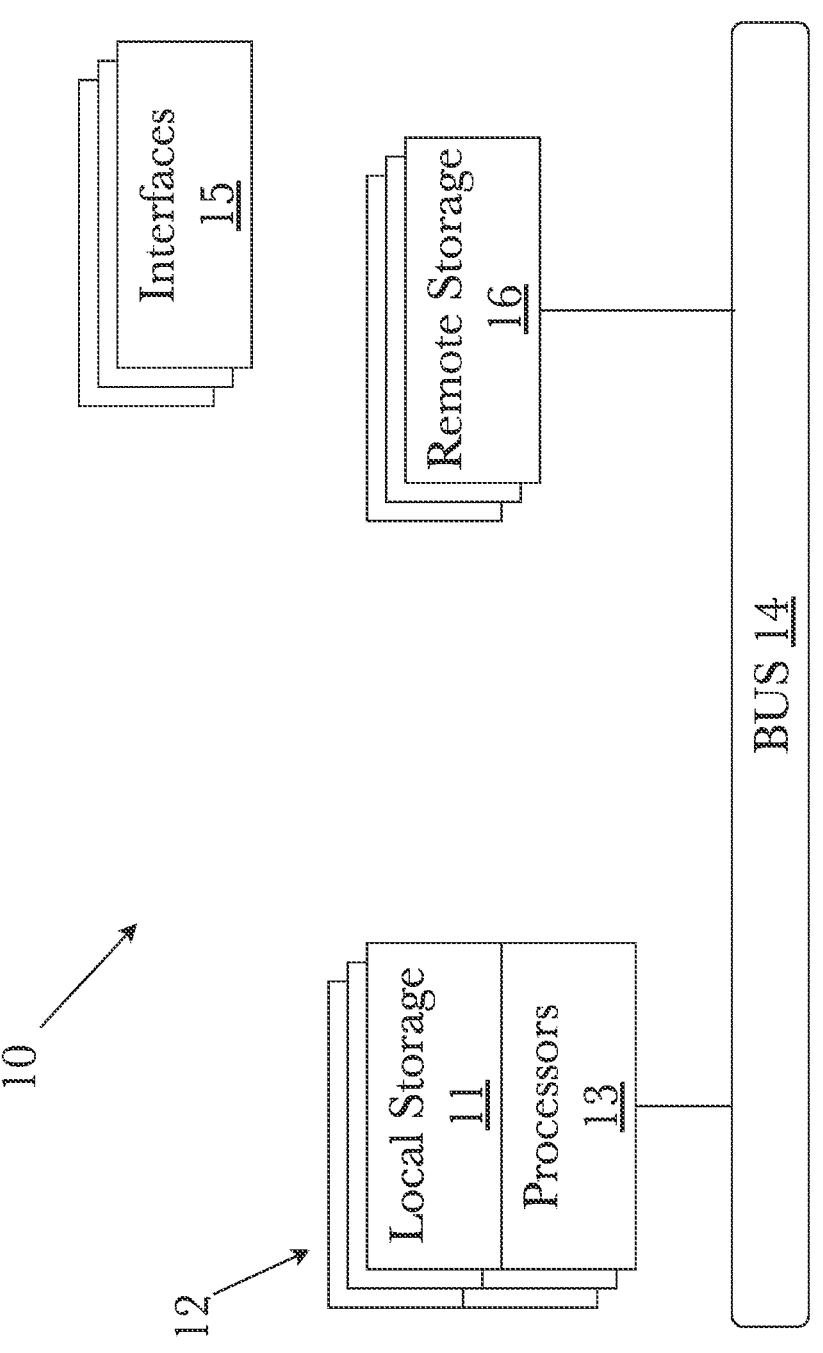
FIG. 12 is a block diagram illustrating an exemplary hardware architecture of a computing device.

Referring now to FIG. 12, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAP-DRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FD-DIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 12 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 13:
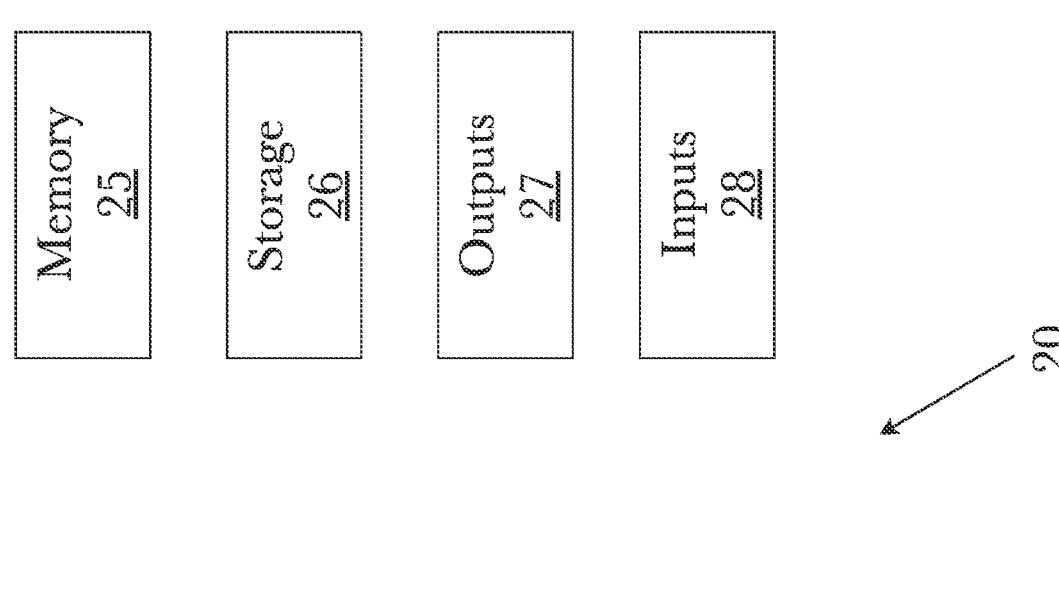
FIG. 13 is a block diagram illustrating an exemplary logical architecture for a client device.

In some aspects, systems may be implemented on a standalone computing system. Referring now to FIG. 13, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 12). Examples of storage devices 26 include flash memory, magnetic hard drive, CD-ROM, and/or the like.

Figure 14:
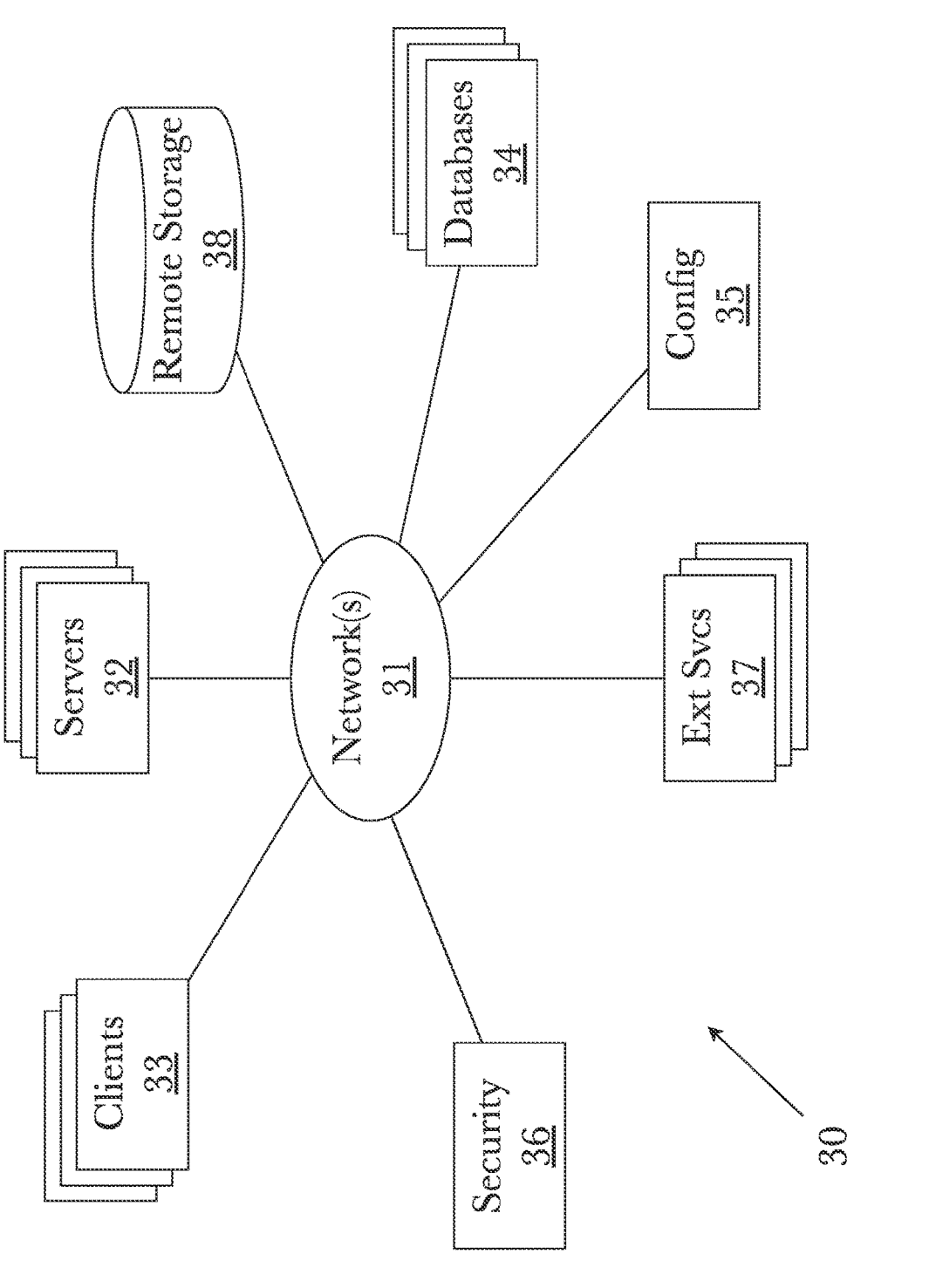
FIG. 14 is a block diagram showing an exemplary architectural arrangement of clients, servers, and external services.

In some aspects, systems may be implemented on a distributed computing network, such as one having any number of clients and/or servers. Referring now to FIG. 14, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 13. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 15:
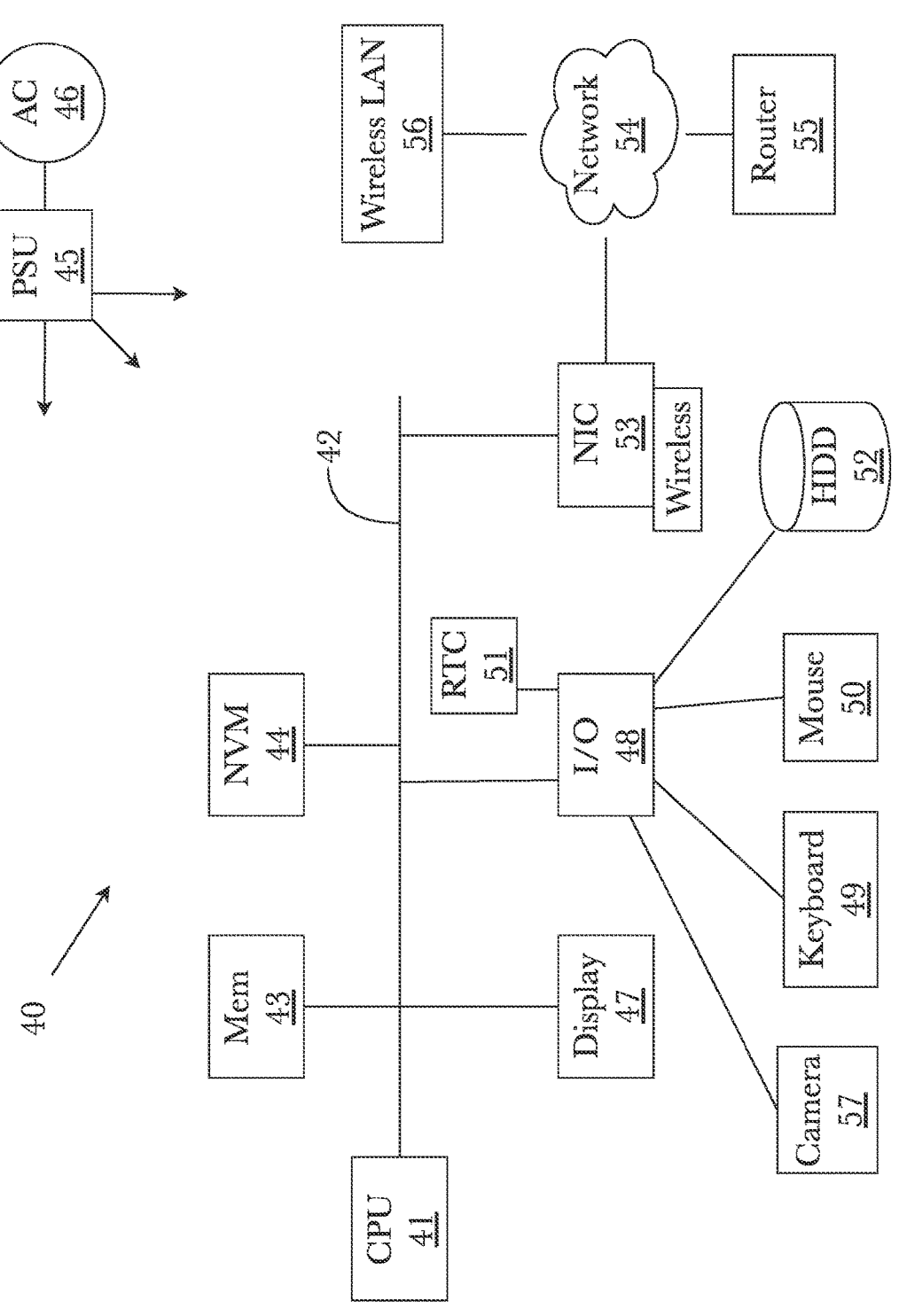
FIG. 15 is another block diagram illustrating an exemplary hardware architecture of a computing device.

FIG. 15 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A computer system for link-initiated dynamic-mode communications, comprising a hardware memory, wherein the computer system is configured to execute software instructions stored on nontransitory machine-readable storage media that:

couple stored media content from one or more databases to an initiator ID, wherein the initiator ID is an identification marker unique to the stored media content, and wherein the media content comprises a call-to-action;

embed the initiator ID into an initiator, wherein the initiator is an interactable object and when interacted with by a mobile computing device, is configured to auto-populate a text message on the mobile computing device;

receive the text message from the mobile computing device, the message comprising the initiator ID and metadata about the mobile device;

retrieve a rule associated with the initiator ID;

execute the instructions contained in the rule;

determine an available agent by executing a deep learning algorithm that analyzes one or more factors comprising time-of-day, day-of-week, resource availability, service level requirements, previous customer interactions, or customer tiering structure;

mask, via an anonymizer executing a machine learning algorithm comprising natural language processing, personally identifiable information in the text message;

reformat, via a message gateway, the masked text message to match the agent's preferred mode of communication, wherein the agent's preferred mode of communication is different than the text message's original mode of communication;

send the reformatted and masked text message to the agent via the agent's preferred mode of communication;

facilitate the sending and receiving of any further messages between the agent and the mobile computing device; and repeat the masking via the anonymizer and the reformatting via the message gateway for all messages facilitated between the agent and the mobile computing device until termination of the communication.

2. The system of claim 1, wherein the initiator comprises an interactable link to an Internet resource, a scannable QR code, or an NFC beacon.

3. The system of claim 2, wherein the call-to-action is information about a product, information about a service, a request to contact an agent, or some combination thereof.

4. The system of claim 3, wherein the computer system is further configured to execute software instructions stored on nontransitory machine-readable storage media that:

retrieve the stored media content associated with the initiator ID; and send the stored media content to the mobile computing device.

5. The system of claim 3, wherein the computer system is further configured to execute software instructions stored on nontransitory machine-readable storage media that:

determine an available agent;

identify the available agent's preferred mode of communication;

mask personally identifiable information in the text message;

reformat the text message to match the agent's mode of communication, wherein the agent's mode of communication is different than the text message's original mode of communication;

send the reformatted and masked text message to the agent;

facilitate the sending and receiving of any further messages between the agent and the mobile computing device; and repeat the masking and reformatting of all messages facilitated between the agent and the mobile computing device until termination of the communication.

6. A method for link-initiated dynamic-mode communications, comprising the steps of:

coupling stored media content from one or more databases to an initiator ID, wherein the initiator ID is an identification marker unique to the stored media content, and wherein the media content comprises a call-to-action;

embedding the initiator ID into an initiator, wherein the initiator is an interactable object and when interacted with by a mobile computing device, is configured to auto-populate a text message on the mobile computing device;

receiving the text message from the mobile computing device, the message comprising the initiator ID and metadata about the mobile device;

retrieving a rule associated with the initiator ID;

executing the instructions contained in the rule;

determining an available agent by executing a deep learning algorithm that analyzes one or more factors comprising time-of-day, day-of-week, resource availability, service level requirements, previous customer interactions, or customer tiering structure;

masking, via an anonymizer executing a machine learning algorithm comprising natural language processing, personally identifiable information in the text message;

reformatting, via a message gateway, the masked text message to match the agent's preferred mode of communication, wherein the agent's preferred mode of communication is different than the text message's original mode of communication;

sending the reformatted and masked text message to the agent via the agent's preferred mode of communication;

facilitating the sending and receiving of any further messages between the agent and the mobile computing device; and repeating the masking via the anonymizer and the reformatting via the message gateway for all messages facilitated between the agent and the mobile computing device until termination of the communication.

7. The method of claim 6, wherein the initiator comprises an interactable link to an Internet resource, a scannable QR code, or an NFC beacon.

8. The method of claim 7, wherein the call-to-action is information about a product, information about a service, a request to contact an agent, or some combination thereof.

9. The method of claim 8, wherein the method further comprises the steps of:

retrieving the stored media content associated with the initiator ID; and sending the stored media content to the mobile computing device.

10. The method of claim 8, wherein the method further comprises the steps of:

determining an available agent;

identifying the available agent's preferred mode of communication;

masking personally identifiable information in the text message;

reformatting the text message to match the agent's mode of communication, wherein the agent's mode of communication is different than the text message's original mode of communication;

sending the reformatted and masked text message to the agent;

facilitating the sending and receiving of any further messages between the agent and the mobile computing device; and repeating the masking and reformatting of all messages facilitated between the agent and the mobile computing device until termination of the communication.

\* \* \* \* \*